(12) United States Patent
Mathew

(10) Patent No.: US 11,256,694 B2
(45) Date of Patent: Feb. 22, 2022

(54) TOLERANCE LEVEL-BASED TUNING OF QUERY PROCESSING

(71) Applicant: HEWLETT PACKARD ENTERPRISE DEVELOPMENT LP, Houston, TX (US)

(72) Inventor: Shine Mathew, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 120 days.

(21) Appl. No.: 16/859,455

(22) Filed: Apr. 27, 2020

(65) Prior Publication Data

US 2021/0334272 A1 Oct. 28, 2021

(51) Int. Cl.
*G06F 16/2453* (2019.01)
*G06F 16/21* (2019.01)

(52) U.S. Cl.
CPC ........ *G06F 16/2454* (2019.01); *G06F 16/217* (2019.01)

(58) Field of Classification Search
CPC ........... G06F 16/2454; G06F 16/24542; G06F 16/24547
See application file for complete search history.

(56) References Cited

U.S. PATENT DOCUMENTS

| 5,742,806 | A | * | 4/1998 | Reiner | G06F 16/24532 |
| 6,598,038 | B1 | | 7/2003 | Guay et al. | |
| 7,031,958 | B2 | | 4/2006 | Santosuosso et al. | |
| 8,903,801 | B2 | | 12/2014 | Belknap et al. | |
| 8,983,934 | B2 | | 3/2015 | Ramacher et al. | |
| 10,152,509 | B2 | | 12/2018 | Baranczyk et al. | |
| 10,592,506 | B1 | * | 3/2020 | Thombre | G06F 16/2453 |
| 2019/0354622 | A1 | * | 11/2019 | Sheldon | G06F 16/24542 |
| 2020/0089679 | A1 | * | 3/2020 | Okcan | G06F 16/2255 |
| 2021/0263936 | A1 | * | 8/2021 | Shah | G06F 16/24549 |

OTHER PUBLICATIONS

Magnus Johansson, "Poor Performance Related to Ads (part2)," Jun. 23, 2016, pp. 1-6, Retrieved from the Internet on Feb. 19, 2020 at URL: <magnusjohanssontuning.wordpress.com/2016/06/23/poor-performance-related-to-ads-part2/>.

* cited by examiner

*Primary Examiner* — William Spieler
(74) *Attorney, Agent, or Firm* — Trop, Pruner & Hu, P.C.

(57) ABSTRACT

An input is accessed representing a tuning parameter for a first query statement and a tolerance level. The tolerance level represents a degree of acceptable discrepancy between the first query statement and another query statement. A first fingerprint is generated for the first query statement based on a content of the first query statement and the tolerance level; and the first fingerprint and the tuning parameter are stored. The first fingerprint is used as an index for an optimizer to associate the tuning parameter with a second query statement that corresponds to the first fingerprint.

20 Claims, 6 Drawing Sheets

TOLERANCE LEVEL-BASED TUNING OF QUERY PROCESSING

BACKGROUND

A typical business enterprise may have organized collections of data, or databases, and for purposes of managing the storage, modification and retrieval of the corresponding data, the business enterprise may have set of software called a "database management system," or "DBMS." As an example, the databases may be relational databases. In a relational database, the data is stored in in tables, and each table is organized in rows and columns. Tables in a relational database may be related based on data common to the tables. The enterprise may use a set of software, called a "relational DBMS," or "RDBMS," to access the relational database for purposes of storing, retrieving and modifying data. More specifically, data of the relational database may be accessed through use of requests, or queries. The queries may, for example, be query statements that are structured according to a particular format (e.g., a structured language (SQL) query format)). As an example, a SQL query statement may contain a SELECT command to request information from one or multiple tables of a relational database and return the requested information in the form of a new table.

DETAILED DESCRIPTION

Figure 1:
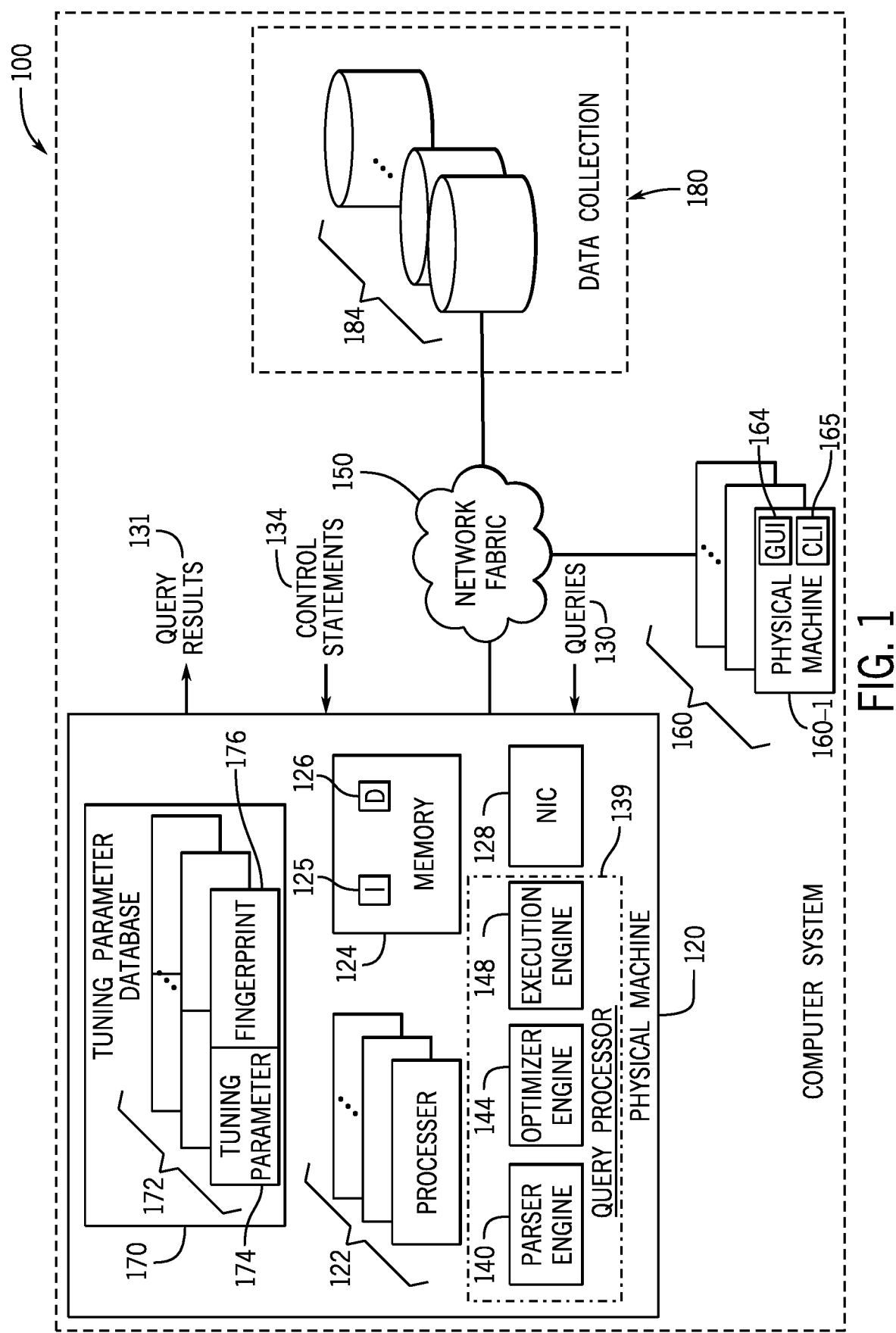
FIG. 1 is a schematic diagram of a computer system according to an example implementation.

An RDBMS may contain a query processor that executes operations to access, store and modify data in a relational database in response to queries that are received by the RDBMS. More specifically, the query processor may, for a given query statement (e.g., a SQL query statement) that represents a query, transform the query statement into a sequence of operations according to a query plan; and the query processor may then execute the sequence of operations to provide a query result.

A query statement may be represented as an expression of one or multiple relational algebraic operators (e.g., set operators, such as union and intersection operators and relational operators, such as join and select operators) and one or multiple aggregation operators (e.g., sort by and group by operators). Moreover, the expression may be represented by a relational expression tree. The internal nodes of the relational expression tree represent the operators, and the leaves of the relational expression tree represents relations. For example, a SQL JOIN of Table A and Table B may be represented, in a relational expression tree, by a JOIN node that has one leaf representing Table A and another leaf representing Table B.

In general, a query statement may potentially be processed in many different ways by the query processor, and each of these ways may be referred to as a potential, or candidate, "query plan." In this context, a "query plan" generally refers to a sequence of operations that are executed in response to a query (e.g., a query expressed as a query statement) to provide a result (herein called a "query result"). A query plan may be represented by a relational expression tree, with each operator of the relational expression tree being annotated with additional information, such as an algorithm and index to be used in the execution of the operator.

The query processor may contain a query optimizer (also called a "query optimizer engine" herein), which may, for a given query, select a query plan, which is then executed by an execution engine of the query processor. The selected query plan may be one of potential multiple query plans that could be executed to provide a query result. These alternative query plans, although providing the same query result, may be associated with different query execution performances. For example, the execution of query plan A may be associated with a relatively large allocated memory footprint due to a relatively large number of rows, or records, that are processed in arriving at the final query result. The execution of query plan B may be associated with a relatively longer processing time due to a relatively large number of operators; the execution of query plan C may be associated with a relatively large allocated memory footprint and processing time; and so forth.

Moreover, the execution of a given query plan may also depend on the algorithms that are selected for different executed operations. For example, for joins, three general types of join algorithms may be used. A merge join algorithm may be used to join two tables that contain all the same keys. A loop join algorithm involves a processing loop that traverses a relatively smaller table to find records corresponding to matching columns in a relatively larger table. A hash join algorithm involves creating a hash table for one table being joined based on the matching columns and then reading the other table being joined and probing the hash table for matches. The particular join algorithm that results in the best execution performance may depend on a number of factors, such as the absolute sizes of the tables, the relative size of one table relative to the other, the ordering of the columns, whether both tables contain the same keys, and so forth.

In accordance with example implementations, a goal of the query optimizer is to, for a given query, determine or select a query plan (called an "optimal query plan") that may be efficiently executed by the execution engine. In this context, the efficient execution of the query plan may be measured by any of a number of performance criteria alone or in combination, such as a memory allocation, a processing time, as well as other and/or different performance criteria.

The optimizer may not always select the best query plan for a given query statement. One way to influence the selection of the query plan is for an experienced user, such as a database administrator, to "hand craft" a specific query statement. In this hand-crafted approach, the user may construct and tune the query statement so that the optimizer will select a query plan that meets certain query processing performance criteria. Another way to influence the selection of a query plan for a specific query statement is for a user, such as an experienced database administrator, to provide one or multiple hints or control statements to guide, or steer, the optimizer to the select the query plan.

As the industry changes, the way in which query statements are generated is also continually evolving, and this evolution is trending away from query statements being specifically crafted by users. Instead, modern database applications and database tools may automatically and dynamically generate query statements based on user inputs or other inputs, which may preclude human input, such as hand-crafted query statements, control statements or hints from being used to influence the selection of query plans.

In accordance with example implementations that are described herein, human input, such as input from an experienced database administrator, may be used to tune query plan selection for a class of query statements, regardless of whether the query statements are dynamically and automatically generated by software or crafted by human users. The human input, in accordance with example implementations, occurs through the use of a control statement that provides, or specifies, a tuning parameter, a tolerance level and a specific query statement.

In this context, the "tuning parameter" refers to an input (e.g., "turn off hash joins") that influences how the optimizer generates the query plan for executing the specific query statement. The tolerance level (e.g., a integer between "0," a strict tolerance level, and "N," the least restrictive tolerance level) controls the scope of the class of future query statements (i.e., query statements that are received and processed after enabling this tuning mechanism) for which the tuning parameter is applied by the optimizer. In this manner, the optimizer applies the tuning parameter to a future query statement if the optimizer determines that the future query statement is in the targeted class using fingerprint matching, as further described herein.

The tolerance level defines an allowable degree of discrepancy between the query statement that is specified in the control statement and the future query statement. The tolerance level may, for example, represent a small allowable discrepancy, such that the optimizer applies the tuning parameter to essentially the same future query statement and does not apply the tuning parameter to other future query statements. In this context, a future query statement being "essentially the same" may, in accordance with example implementations, refers to a normalized version of the future query statement (e.g. a statement in which the case of the text has been converted to either all uppercase or all lowercase, comments have been removed, extra spaces have been removed, and so forth) being the same as a normalized version of the query statement that is specified in the control statement. The tolerance level may, however, represent a relaxed matching criterion and thus, a broader scope for the class, such that the optimizer applies the tuning parameter to future query statements that are not essentially the same as the query statement that is specified in the control statement.

In accordance with example implementations, the control statement may further specific criteria other than a specific query statement to define the applicable class. For example, in accordance with some implementations, the control statement may specify a particular data source or tenant to which the tuning parameter applies. For these implementations, the tolerance level may represent an allowable deviation for purposes of identifying data sources and/or tenants to which the tuning parameter is to be applied.

In accordance with example implementations, the optimizer generates fingerprints for query statements and uses fingerprint matching to identify which tuning parameter(s) are to be applied by the optimizer in the processing of a given query statement. In this context, a "fingerprint" refers to an identifier that is associated with (e.g., uniquely associated with) an entity, such as a query statement. In accordance with example implementations, in response to receiving a control statement that specifies a tuning parameter, a query statement and a tolerance level, the optimizer generates a fingerprint for the tuning parameter based on the content of the query statement and the tolerance level. The optimizer stores the tuning parameter and generated fingerprint as an associated pair as an entry in a tuning parameter data store, or database. For a future query statement, the optimizer generates one or multiple fingerprints for the query statement (as further described herein) for purposes of identifying one or multiple tuning parameters from the tuning parameter database, which have matching fingerprints and which may be applied by the optimizer to the processing of the query statement.

As a more specific example, FIG. 1 depicts a computer system 100, such as a computer system that may be used as part of a DBMS. In accordance with example implementations, the computer system 100 includes a physical machine 120 that includes hardware and software components. As examples, the physical machine 120 may be a desktop computer, a server, a client, a rack-based computer unit, and so forth.

In accordance with example implementations, the hardware components of the physical machine 120 include one or multiple processors 122 (e.g., one or multiple central processing units (CPUs), one or multiple CPU processing cores, and so forth); a memory 124; and a network interface card (NIC) 128. The physical machine 120 may contain various other hardware components that are not depicted in FIG. 1, such as accelerators, bridge chips, bus interfaces, input/output (I/O) devices, and so forth.

In general, the memory 124 contains non-transitory memory devices, such as semiconductor storage devices, flash memory devices, memristors, phase change memory devices, a combination of one or more of the foregoing storage technologies, and so forth. Moreover, the memory devices may be volatile memory devices (e.g., dynamic random access memory (DRAM) devices, static random access (SRAM) devices, and so forth) and/or non-volatile memory devices (e.g., flash memory devices, read only memory (ROM) devices and so forth).

In accordance with example implementations, the software components of the physical machine 120 include a query processor 139 that processes incoming database requests, or queries 130, to provide corresponding query results 131. In this context, a "query" represents a request to store, retrieve or modify data stored in a database, such as a database of a data collection 180. The physical machine 120 may have various other software components that are not depicted in FIG. 1, such as an operating system, device drives, firmware, libraries, and so forth.

The data collection 180 represents one or multiple databases 184. It is noted that one or multiple of such databases 184 may be a distributed database, i.e., a database that is distributed on multiple computing and/or storage nodes.

In accordance with example implementations, the databases 184 may be relational databases that store data organized in tables, where the data of each table in organized in rows and columns; and the physical machine 120 may be used to form at least part of an RDBMS. In accordance with example implementations, the queries 130 may originate with physical machines 160 that are coupled to the physical machine 120 via network fabric 150. As examples, the queries 130 may correspond to query statements that are dynamically generated by applications or tools that execute on the physical machines 160; may be generated by users specifically crafting the query statements according to a particular query language construct (e.g., according to a SQL standard); may be generated by graphical user interfaces (GUIs) of the physical machines 160 in response to users supplying parameters for the queries 130; and so forth.

The physical machines 160 may also be used to provide control statements 134 for purposes of providing tuning parameters (as further described herein) to control the processing of certain queries 130. FIG. 1 depicts a specific physical machine 160-1 that contains a GUI 164 or a command line interface 165, which a user (e.g., a database administrator) may use to enter input representing one or multiple control statements 134 and provide the control statements 134 via the network fabric 150 to the query processor 139.

As depicted in FIG. 1, the network fabric 150 may further couple the physical machine 120 (and query processor 139) to the data collection 180 so that the query processor 139 may, for a given query request 130, execute operations to perform the action(s) with the data collection 180 corresponding to the request 130. In general, the network fabric 150 may include components and use protocols that are associated with one or multiple types of communication networks, such as (as examples) Fiber Channel networks, iSCSI networks, ATA over Ethernet (AoE) networks, Hyper-SCSI networks, local area networks (LANs), wide area networks (WANs), global networks (e.g., the Internet), wireless networks, or any combination thereof.

In accordance with example implementations, the one or multiple processors 122 execute machine executable instructions 125 (or "software") that are stored in the memory 124 to form components of the query processor 139, such as a parser engine 140 (or "parser"), optimizer engine 144 (or "optimizer") and execution engine 148 (or "executor"). In general, the parser engine 140 processes an incoming query 130 to identify the different elements of the query 130, such as keywords, commands, constants, parameters, relations, and so forth. The optimizer engine 144 determines a query plan for the query 130, which sets forth a sequence of operations to be performed; and the execution engine 148 executes the operations to provide the corresponding query result 131.

The memory 124 may also store data 126. The data 126 may represent any of a number of different data structures that may represent, as examples, query statements, fingerprints, tolerance levels, tuning parameters, parameters involved in determine fingerprints, parameters involved in matching fingerprints, parsed components of queries, query results, and so forth. In accordance with some implementations, a tuning parameter database 170 may be stored in the memory 124.

The tuning parameter database 170, in accordance with example implementations, store tuples, or entries 172. In accordance with some implementations, each entry 172 may contain data representing a tuning parameter 174 and an associated fingerprint 176. In accordance with example implementations, the optimizer engine 144 generates multiple fingerprints for an incoming query statement (i.e., a query statement that corresponds to a query 130 and for which, the optimizer engine 144 is to generate a query plan). These different fingerprints, in turn, correspond to different tuning parameter tolerance levels. The optimizer engine 144 may then, in accordance with example implementations, search the tuning parameter database 170 for one or multiple entries 172 that contain fingerprints 176 that match the fingerprint(s) for the incoming query statement and apply the corresponding tuning parameters 174 to generate the query plan for processing the query statement.

In accordance with example implementations, the above-described processing of a query statement by the optimizer engine 144 corresponds to a second phase of a two-phase process. The first phase is associated with the optimizer engine 144 receiving input through a control statement 134, which identifies a specific query statement, a tuning parameter to be applied to the specific query statement, and a tolerance level, which represents a degree of acceptable deviation from the specific query statement for purposes of identifying future query statements to which the tuning parameter is to be applied. In accordance with example implementations, based on the content of the specific query statement and the tolerance level, phase one includes the optimizer engine 144 generating a fingerprint based on the content of the query statement and the tolerance level. An example process 200 used by the optimizer engine 144 in phase one is depicted in FIG. 2.

Figure 3:
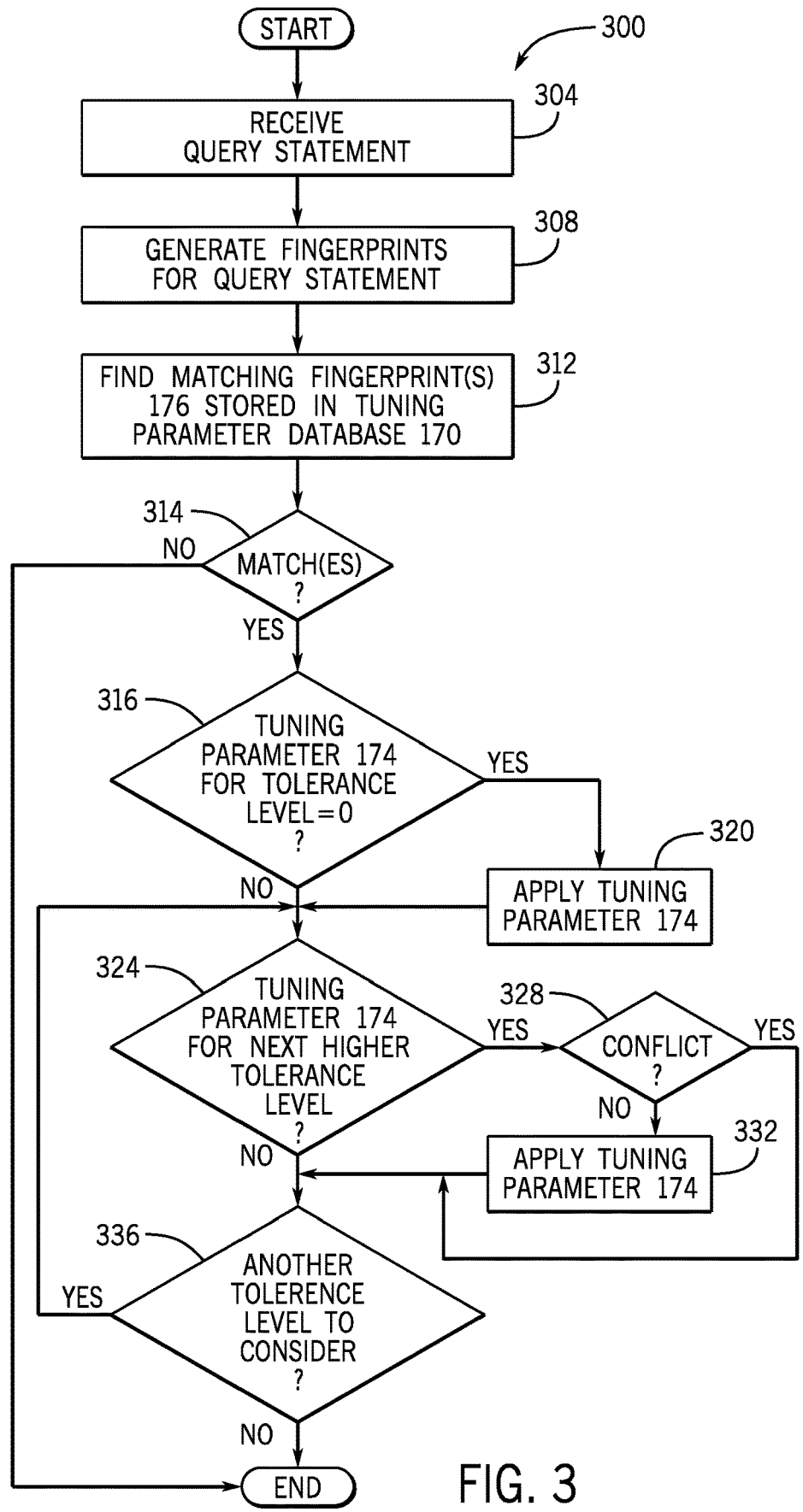
FIG. 3 is a flow diagram depicting a process to select a tuning parameter to apply to a query statement based on fingerprints generated for the query statement according to an example implementation.

Phase two involves the optimizer engine 144 applying the stored tuning parameters 174 to the processing of query statements. In this manner, in accordance with example implementations, for phase two, the optimizer engine 144 may generate multiple fingerprints for a given query statement, and the optimizer engine 144 uses these fingerprints to identify matching fingerprints 176 in the tuning parameter database 170, so that the tuning parameter(s) 174 corresponding to any matching fingerprint(s) may potentially be applied to the processing of the query statement. An example process 300 used by the optimizer engine 144 in phase two is depicted in FIG. 3.

In accordance with example implementations, the "fingerprints" that are described herein are "hashes," or "hash values." In this context, a "hash," or "hash value," refers to a value that is produced by the application of a cryptographic hash function to an input (e.g., a binary image of a given unit of code) to produce the hash. In this manner, a cryptographic hash function may be applied, or performed, by a processor executing machine-executable instructions ("software") to receive an input and produce an output (the "hash") that corresponds to the input. Any minute change to the input may alter the hash. As examples, the cryptographic hash function may be a signed hash function (SHA), any federal information processing standards (FIPS) approved hash function, any national institute of standards and technology (NIST) approved hash function, or any other cryptographic hash function. Moreover, in accordance with further example implementations, a cryptographic hash function may be a function that is applied, or performed, by a hardware circuit (e.g., an application specific integrated circuit (ASIC), a field programmable gate array (FPGA), and so forth) without executing machine-executable instructions.

Figure 2:
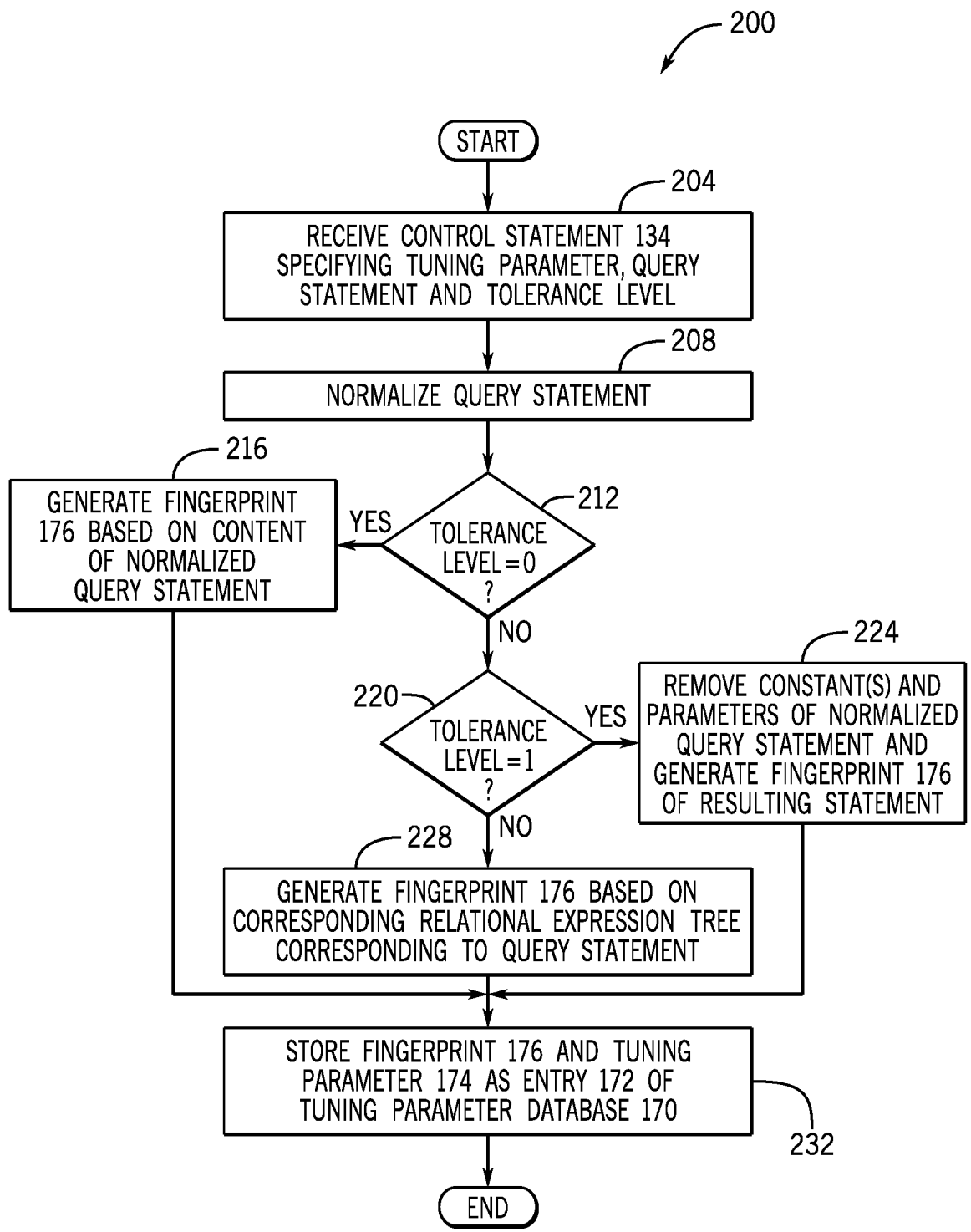
FIG. 2 is a flow diagram depicting a process to generate a fingerprint for a tuning parameter based on a tolerance level according to an example implementation.

Referring to FIG. 2 in conjunction with FIG. 1, in accordance with example implementations, the optimizer engine 144 accesses, or receives (block 204), a control statement 135 (e.g., a SQL SET Control Query Default (CQD) statement), which specifies a tuning parameter, a specific query statement and an associated tolerance level.

As a more specific example, a database administrator may want to improve the processing of the following query:

SELECT*FROM T1 JOIN T2 ON T1.a=T2.a WHERE T2.b=10;

For this example, the database administrator may observe that the processing of the query does not meet certain performance criteria (e.g., the processing of the query statement takes an unexpectedly long time). To improve the query processing performance, the database administrator may use a SET CQD statement to specify a specific tuning parameter for this query statement. For this example, the tuning parameter specifies that a hash join algorithm is not to be used, i.e., determines to turnoff hash joins, in the processing of the query statement.

More specifically, for this example, the control statement 135 may be as follows:
SET CQD HASH_JOINS 'OFF' WITH TOLERANCE LEVEL 0 FOR select*FROM T1 join T2 ON T1.a=T2.a where T2.b=10;
For this control statement 134, "SET CQD" denotes the statement as being a control statement with the tuning parameter (HASH_JOINS 'OFF') immediately following and instructing the optimizer engine 144 to not use the hash algorithm for any joins; the keyword "WITH" immediate precedes the tolerance level (TOLERANCE LEVEL 0), which here, designates a tolerance level of "0"; and the keyword "FOR" immediately precedes the specified query statement (select*FROM T1 join T2 ON T1.a=T2.a where T2.b=10). It is noted that in this example, the case of the text of the control statement 134 and the case of the specified query statement may be permitted by the query language standard (e.g., SQL standard) and may vary, as in this example. The normalization of the specified query statement, as described below, ensures that the text case and other potential non-substantive variations do not affect the corresponding fingerprint that is generated for the query statement.

Beginning in block 208, the optimizer engine 144 begins a process to generate a fingerprint for the query statement that is specified in the control statement 134. As a first part of this process, the optimizer engine 144 normalizes the query statement, pursuant to block 208. In accordance with example implementations, the normalization includes removing nonmeaningful characters and formatting, such as empty spaces, tabs, line breaks, comments, and so forth. Moreover, in accordance with example implementations, the normalization may involve converting the case of the text of the query statement to a predefined case (i.e., either converting the text to all be in uppercase or converting the text to all be in lowercase).

For example, in accordance with some implementations, the normalization may involve the optimizer engine 144 normalizing the example specified query statement to remove the extra space between "*" and "from" and to convert the query statement to be in all lower case to generate the following normalized query statement:

select*from t1 join t2 on t1.a=t2.a where t2.b=10

As depicted in decision block 212, the optimizer engine 144, pursuant to the process 200, then considers the particular specified tolerance level by first considering whether the tolerance level is equal to "0." If so (as for the example above), the optimizer engine 144 generates (block 216) a fingerprint 176 based on the content of the normalized query statement. For example, the optimizer engine 144 may determine a hash value represent the string "select*from t1 join t2 on t1.a=t2.a where t2.b=10" by converting the characters to the string to sequence of character code numbers and applying a cryptographic hash algorithm to this sequence to derive a hash value that represents the fingerprint 176. The optimizer engine 144 then associates the fingerprint 176 with the tuning parameter 174 and stores data representing this pair as an entry 172 in the tuning parameter database 170, pursuant to block 232. Due to the nature of hash functions and their associated hash values, a different query statement that results in even a slightly different normalized query statement will correspond to a different fingerprint.

For example, the example normalized query statement above may be slightly changed by replacing the constant "10" with the constant "20" to produce the following statement:

select*from t1 join t2 on t1.a=t2.a where t2.b=20

Even with this slight modification, in accordance with example implementations, this query statement has a different fingerprint than the fingerprint that was generated for the "select*from t1 join t2 on t1.a=t2.a where t2.b=10" statement; and as such, because the tuning parameter for the select*from t1 join t2 on t1.a=t2.a where t2.b=10" statement for this example has a tolerance level of "0"; the optimizer engine 144 would not apply the tuning parameter in the processing of the future query statement "select*from t1 join t2 on t1.a=t2.a where t2.b=20."

FIG. 2 further depicts how the optimizer engine 144, pursuant to the process 200, generates fingerprints 176 for specified query statements when the specified tolerance level is not "0." In accordance with example implementations, the process 200 further includes, in decision block 220 (assuming that the tolerance level is not "0"), the optimizer engine 144 determining whether the tolerance level is "1." If so, then, pursuant to block 224, the optimizer engine 144 generates a fingerprint corresponding to the tolerance level of "1". More specifically, in accordance with example implementations, for the tolerance level "1," the optimizer engine 144 further processes the normalized query statement to remove any constants or parameters from the normalized query statement to generate a resulting query statement; the optimizer engine 144 generates a fingerprint 176 from this resulting query statement; and the optimizer engine 144 stores the fingerprint 176 and tuning parameter 174 as an entry in the tuning parameter database 170, pursuant to block 232.

An example, for a tolerance level of "1," the optimizer engine 144 may further process the example normalized query statement to generate the following query statement to generate a tolerance level 1 fingerprint 176:

select*from t1 join t2 on t1.a=t2.a where t2.b=

This tolerance level 1 fingerprint 176 may then be used to identify a relatively broader class of query statements (relative to the tolerance to which (and tolerance "0" fingerprint) query statements. In other words, for tolerance level of "1," the following example query statements have identical fingerprints 176:

select*from t1 join t2 on t1.a=t2.a where t2.b=10
select*from t1 join t2 on t1.a=t2.a where t2.b=20
select*from t1 join t2 on t1.a=t2.a where t2.b=?

In accordance with example implementations, the optimizer engine 144 may generate fingerprints 176 corresponding to higher specified tolerance levels (i.e., tolerance levels of "2" or greater). In accordance with example implementations, the optimizer engine 144 may generate a fingerprint for a higher tolerance level based on the output of a particular query processing level. For example, in accordance with some implementations, a tolerance level of "2" refers to a tolerance level in which the fingerprint for a query statement is generated based on a shape of a relational expression tree that describes the query statement.

More specifically, in accordance with some implementations, the query processor 139 (e.g., the parser engine 140), in the processing of a query statement, generates a relational expression tree describing the normalized query statement; and for a tolerance level of "2," the optimizer engine 144 generates a fingerprint 176 that corresponds to the shape of the relational expression tree for the query statement. In this context, the "shape" of the relational expression tree refers to the overall structure of the tree, without considering a specific value for any leaf or node of the tree. As one example, in accordance with some implementations, the optimizer engine 144 may generate an ordered tuple, where the entries of the tuple are ordered according to hierarchical levels and collectively describe the shape, or structure, of the relational expression tree. The fingerprint may be generated, for example, by applying a hash function to the values of the ordered tuple. As another example, in accordance with other implementations, the optimizer engine 144 may apply unique integers to unique shapes, or structures, or relational trees, such that the fingerprint corresponds to one of these integers. The optimizer engine 144 may use other ways may be used to generate fingerprints corresponding to relational expression tree shapes, or structures, according to further implementations.

Thus, in accordance with example implementations, pursuant to the process 200, if the control statement 134 does not specify a tolerance level of "1" (decision block 220), then the optimizer engine 144 assumes a tolerance level of "2," generates (block 228) the fingerprint 176 based on a relational expression tree that corresponds to the normalized query statement, and stores (block 232) the fingerprint 176 and tuning parameter 174 as an entry 172 in the tuning parameter database 170. In accordance with further example implementations, the tolerance level may be an optional parameter for a control statement 134; and for these implementations, the optimizer engine 144 assumes a "0" or "1" for the tolerance level to minimize the applicability.

As a more specific example, the normalized query statement may be as follows:

select*from t1 left join t2 on t1.a=t2.c where t2.d>20

The corresponding relational expression tree for this example normalized query statement is the following:

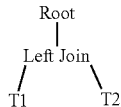

Here, "Root" is the root node; "Left Join" represents an operator node correspond to a left join operation; and "T1" and "T2" are respective leafs that represent the tables being joined. The fingerprint 176 generated for this relational expression tree, in accordance with example implementations, may have the same fingerprint 176 as the fingerprints 176 generated for other query statements that have the same relational expression tree shape.

As examples, in accordance with some implementations, the following query statements have the same relational expression tree shape as the example query statement above:

select*from t1 left join t2 on t1.a=t2.c where t2.d>20
  select*from t1 left join t2 on t1.a=t2.c
  select*from t1 left join t2 on t1.b=t2.x
select*from t1 left join t2 on t1.a=t2.c where t1.d<10

Although the process 200 considers three tolerance levels, in accordance with further implementations, the optimizer engine 144 may generate fingerprints 176 corresponding to fewer than or more than three tolerance levels. Moreover, in accordance with further implementations, the optimizer engine 144 may generate a fingerprint 176 based on information in addition to the content of the query statement or the shape of the corresponding relational expression tree. For example, in accordance with some implementations, the optimizer engine 144 may further base the generation of a fingerprint 176 on a particular tenant or a particular data source. For example, in accordance with some implementations, the optimizer engine 144 may generate a level 0 fingerprint by applying a cryptographic hash algorithm to the normalized query statement to derive a first hash value, applying the cryptographic hash algorithm to the normalized query statement to determine a second hash value, and applying the cryptographic hash algorithm to a combination of the first and second hash values (e.g., a summation of the first and second hash values) to produce a third hash value that represents the fingerprint 176.

In accordance with example implementations, the optimizer engine 144 may identify tuning parameters 174 to apply to query statements pursuant to the process 300 of FIG. 3. Referring to FIG. 3 in connection with FIG. 1, in accordance with example implementations, the optimizer engine 144 accesses or receives (block 304) a query statement and generates (block 308) multiple fingerprints for the received query statement. In accordance with example implementations, the optimizer engine 144 may generate fingerprints for the query statement corresponding to the tolerance "0," "1," "2" fingerprints, in manner similar to that described above in the discussion of FIG. 2. Pursuant to block 312, the optimizer engine 144 searches the tuning parameter database 170 to find any fingerprint 176 stored in the tuning parameter database 170 that match the generated fingerprints. It is noted that this matching may identify, zero, one or more entries 172 of the tuning parameter database 170. The optimizer engine 144 may then consider applying the matching the tuning parameter(s) of the found entry(ies) 172 to the processing of the received query statement.

If the optimizer engine 144 determines (decision block 314) that at least one match was found, then, the optimizer engine 144 determines (decision block 316) if a tuning parameter 174 for tolerance level "0" (i.e., the tolerance level corresponding to the smallest allowable deviation) was found. If so, in accordance with example implementations, the optimizer engine 144 applies the tolerance level "0" tuning parameter 174, pursuant to block 320.

In accordance with example implementations, the optimizer engine 144 may then proceed with determining whether to apply tuning parameters associated with higher tolerance levels. More specifically, as depicted in FIG. 3, in accordance with example implementations, the optimizer engine 144 determines (decision block 324) whether to apply a tuning parameter for the next higher tolerance level. For example, in the matching of block 312, the optimizer engine 144 may identify, for example, a tuning parameter associated with tolerance level "1." There may be a conflict (in view of a previously applied tuning parameter), and as such, the optimizer engine 144 determines (decision block 328) whether there is a conflict and if not, applies (block 332) the tuning parameter 174. If a tuning parameter corresponding to another tolerance level is to be considered (decision block 336), then the optimizer engine 144 may repeat the loop by returning to decision block 324.

Other implementations are contemplated, which are within the scope of the appended claims. For example, the tuning parameter may be a parameter other than a parameter that specifies that hash joins are not to be used, or turned off. As examples, the tuning parameters may be parameters to turn on and off nested joins or merge joins; parameters to control an optimization level; parameters to control interactive access, parameters to control a left join to an inner join transformation level; and so forth. Other turning parameters may be used in accordance with further implementations.

Figure 4:
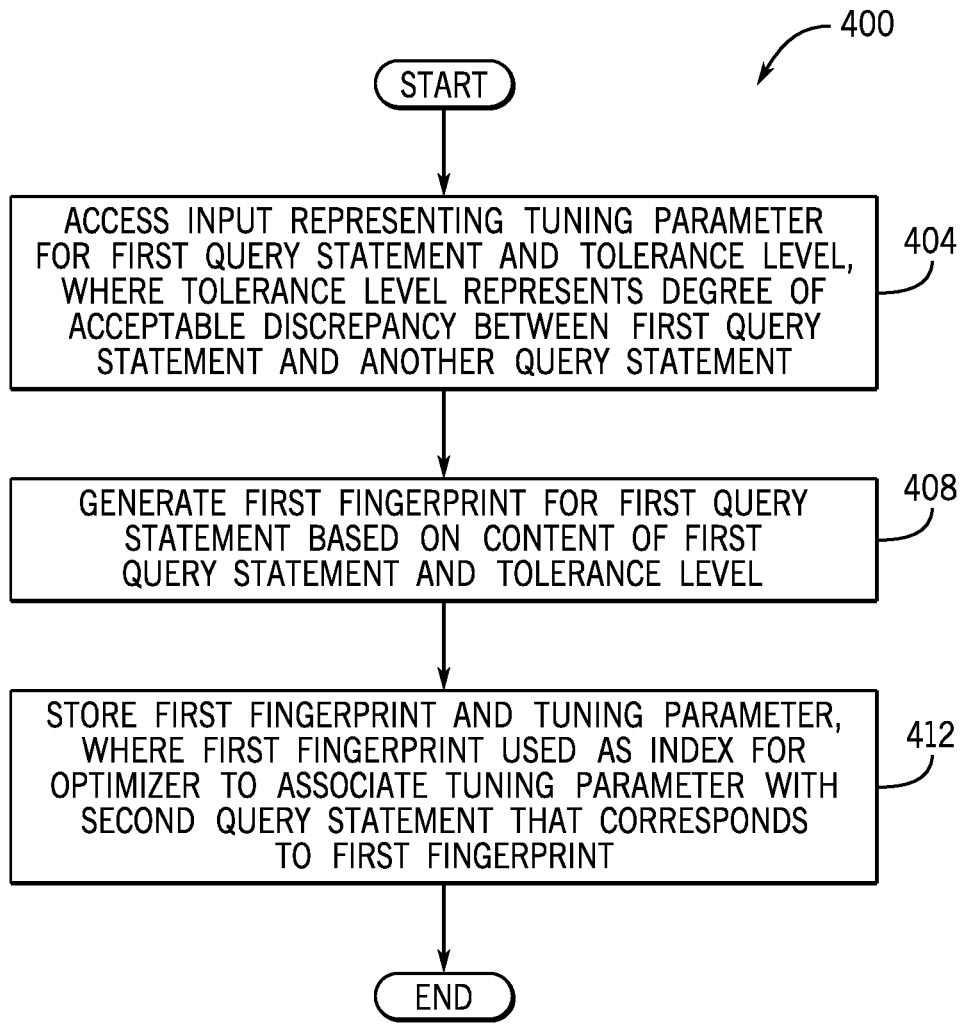
FIG. 4 is a flow diagram depicting a process to generate a fingerprint for a query statement based on a content of the query statement and a tolerance level according to an example implementation.

Referring to FIG. 4, in accordance with example implementations, a process 400 includes accessing (block 404) input representing a tuning parameter for a first query statement and a tolerance level. The tolerance level represents a degree of acceptable discrepancy between the first query statement and another query statement. The process 400 includes generating (block 408) a first fingerprint for the first query statement based on a content of the first query statement and the tolerance level; and storing (block 412) the first fingerprint and the tuning parameter. The first fingerprint is used as an index for an optimizer to associate the tuning parameter with a second query statement that corresponds to the first fingerprint.

Figure 5:
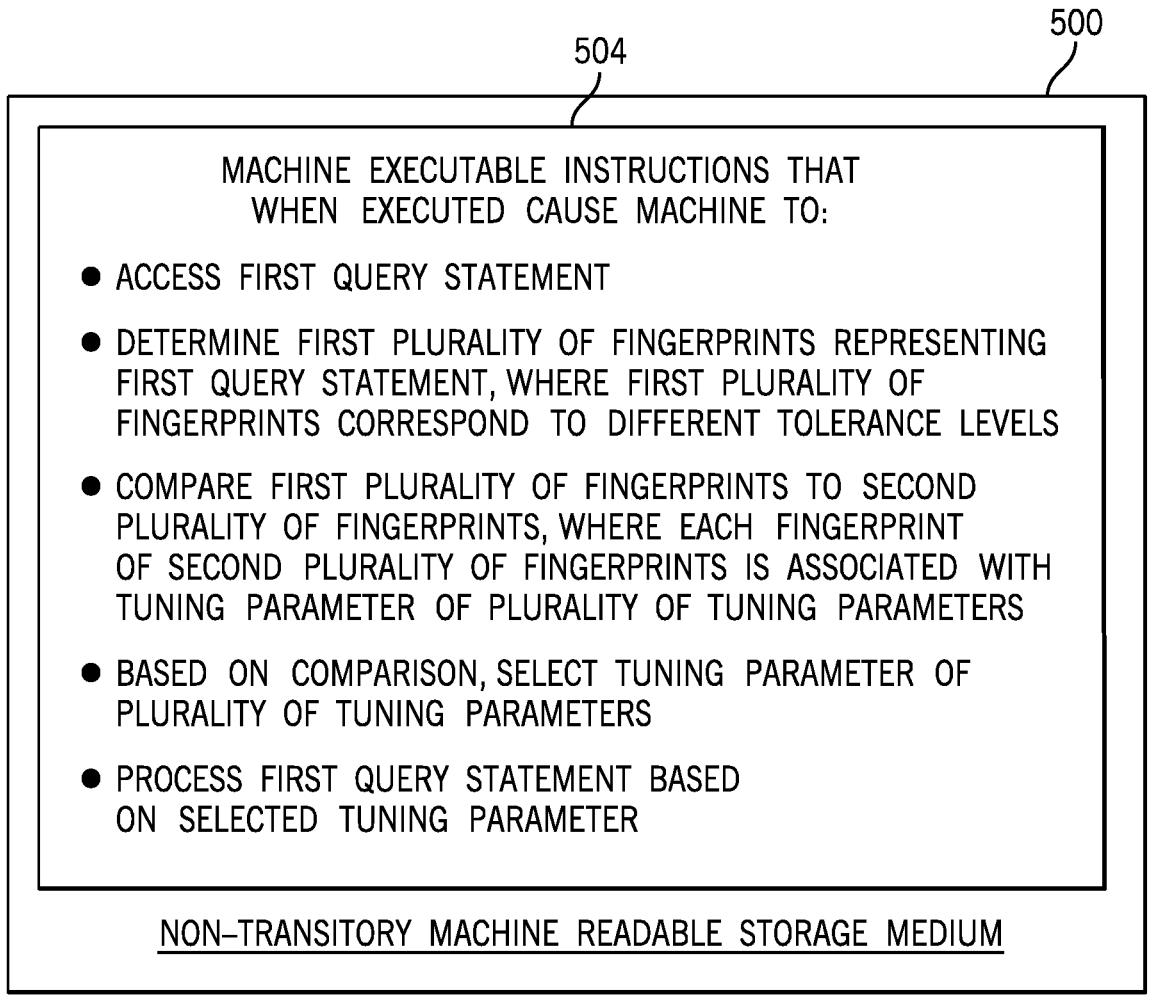
FIG. 5 is a schematic diagram of a system to select a tuning parameter for a query statement and process the query statement based on the selected tuning parameter according to an example implementation.

Referring to FIG. 5, in accordance with example implementations, a non-transitory machine readable storage medium 500 stores instructions 504 that, when executed by a machine, cause the machine to access a first query statement, a tuning parameter for the first query statement and a tolerance level defining a degree of association between the first query statement and the tuning parameter. The instructions 504, when executed by the machine, further cause the machine to, based on the tolerance level and the content of the first query statement, process the first query statement to generate a first hash value; and associate the first hash value with the tuning parameter.

Figure 6:
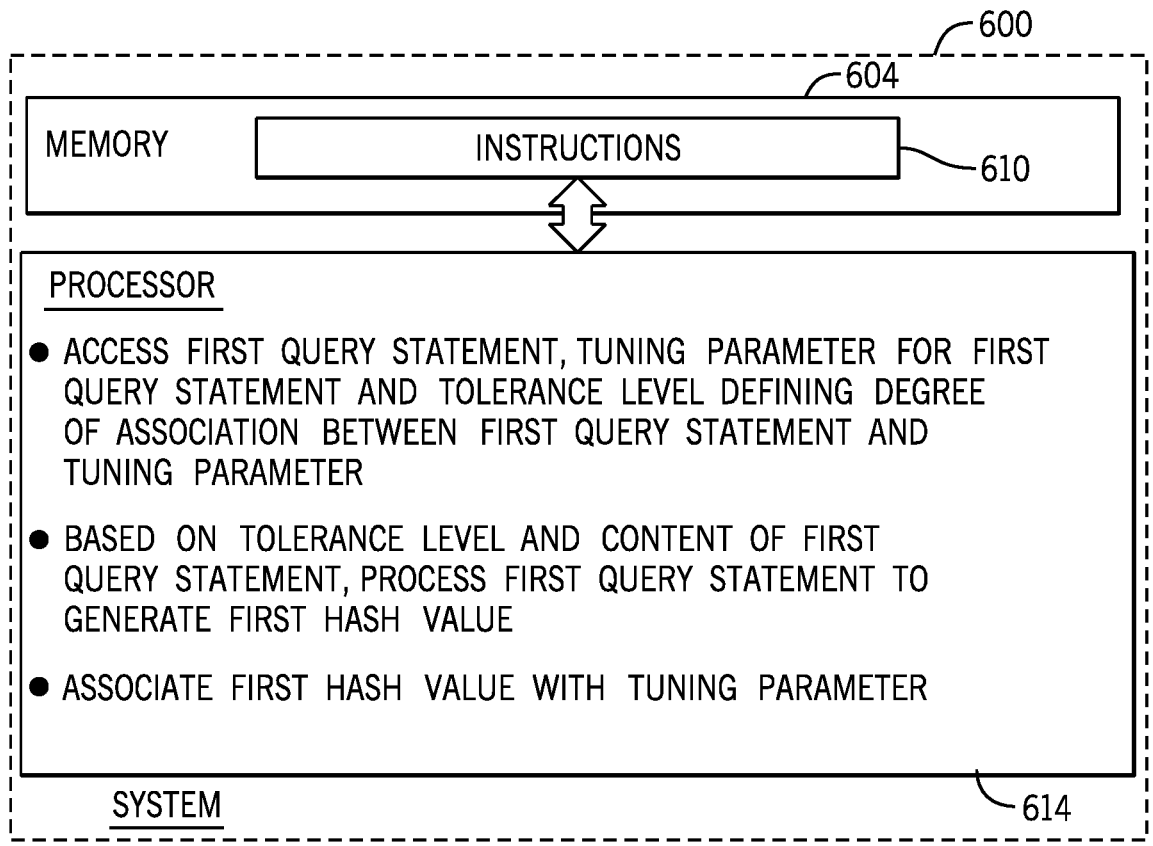
FIG. 6 is an illustration of machine executable instructions stored on a non-transitory machine readable storage medium to cause a machine to generate a hash value based on a tolerance level and a content of a query statement and associate the hash value with a tuning parameter according to an example implementation.

Referring to FIG. 6, in accordance with example implementations, a system 600 includes a processor 614 and a memory 604. The memory 604 stores instructions 610 that, when executed by the processor 614, cause the processor 614 to access a first query statement; and determine a first plurality of fingerprints representing the first query statement. The first plurality of fingerprints correspond to different tolerance levels. The instructions 610, when executed by the processor 614, further cause the processor 614 to compare the first plurality of fingerprints to a second plurality of fingerprints, where each fingerprint of the second plurality of fingerprints is associated with a tuning parameter of a plurality of tuning parameters; based on the comparison, select a tuning parameter of the plurality of tuning parameters; and process the first query statement based on the selected tuning parameter.

In accordance with an example implementation, generating the first fingerprint includes normalizing the first query statement to provide a normalized query statement and determining the first fingerprint based on the normalized query statement and the tolerance level. A particular advantage is that features may be removed in the normalization to allow the first query statement to be matched to a certain breadth of future query statements based on the tolerance level.

In accordance with an example implementation, normalizing the first query statement includes removing at least one of a space, a tab, a line break or a comment of the first query statement. A particular advantage is that features may be removed in the normalization to allow the first query statement to be matched to a certain breadth of future query statements based on the tolerance level.

In accordance with example implementations, normalizing the first query statement includes converting a case of the first query statement. A particular advantage is that features may be removed in the normalization to allow the first query statement to be matched to a certain breadth of future query statements based on the tolerance level.

In accordance with example implementations, generating the first fingerprint includes removing a constant or a parameter from the first query statement to provide a second query statement and generating the first fingerprint based on the second query statement. A particular advantage is that the same tuning parameter may be applied to statements that only differ by constants or parameters.

In accordance with an example implementation, generating the first fingerprint includes determining a relational expression tree for the first query statement and determining the first fingerprint based on the relational expression tree. A particular advantage is that a class of similar query statements may be identified for application of the tuning parameter.

In accordance with an example implementation, determining the first fingerprint based on the relational expression tree includes determining the first fingerprint based on a shape of the relational expression tree. A particular advantage is that a class of similar query statements may be identified for application of the tuning parameter.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
   accessing input representing a tuning parameter for a first query statement and a tolerance level, wherein the tolerance level represents a degree of acceptable discrepancy between the first query statement and another query statement;
   generating a first fingerprint for the first query statement based on a content of the first query statement and the tolerance level; and
   storing the first fingerprint and the tuning parameter, wherein the first fingerprint is used by an optimizer as an index to associate the tuning parameter with a second query statement that corresponds to the first fingerprint.

2. The method of claim 1, wherein generating the first fingerprint comprises normalizing the first query statement to provide a normalized query statement; and
   determining the first fingerprint based on the normalized query statement and the tolerance level.

3. The method of claim 2, wherein normalizing the first query statement comprises removing at least one of a space, a tab, a line break or a comment of the first query statement.

4. The method of claim 2, wherein normalizing the first query statement comprises converting a case of the first query statement.

5. The method of claim 1, wherein generating the first fingerprint comprises:
   removing a constant or a parameter from the first query statement to provide a second query statement; and
   generating the first fingerprint based on the second query statement.

6. The method of claim 1, wherein generating the first fingerprint comprises determining a relational expression tree for the first query statement; and determining the first fingerprint based on the relational expression tree.

7. The method of claim 6, wherein determining the first fingerprint based on the relational expression tree comprises determining the first fingerprint based on a shape of the relational expression tree.

8. The method of claim 6, wherein:

determining the relational expression tree comprises processing the first query statement to remove a column or a predicate to provide a second query statement and determining the relational expression tree based on the second query statement.

9. A system comprising:

a processor; and a memory to store instructions that, when executed by the processor, cause the processor to:

access a first query statement;

determine a first plurality of fingerprints representing the first query statement, wherein the first plurality of fingerprints correspond to different tolerance levels;

compare the first plurality of fingerprints to a second plurality of fingerprints, wherein each fingerprint of the second plurality of fingerprints is associated with a tuning parameter of a plurality of tuning parameters;

based on the comparison, select a tuning parameter of the plurality of tuning parameters; and process the first query statement based on the selected tuning parameter.

10. The system of claim 9, wherein:

a given fingerprint of the first plurality of fingerprints corresponds to given tolerance level of the tolerance levels; and the given tolerance level represents an acceptable degree of discrepancy between the given fingerprint and another fingerprint.

11. The system of claim 9, wherein the instructions, when executed by the processor, further cause the processor to:

compare a first fingerprint of the first plurality of fingerprints with the second plurality of fingerprints;

select a given tuning parameter of the plurality of tuning parameters associated with a second fingerprint of the second plurality of fingerprints that matches the first fingerprint; and process the second query statement based on the given tuning parameter.

12. The system of claim 9, wherein the instructions, when executed by the processor, further cause the processor to:

normalize the first query statement to provide a normalized query statement; and determine the first plurality of fingerprints based on the normalized query statement.

13. The system of claim 9, wherein the instructions, when executed by the processor, further cause the processor to:

determine a tree corresponding to the first query statement, wherein the tree comprises nodes corresponding to relational algebra operators; and determine a given fingerprint of the first plurality of fingerprints based on the tree.

14. The system of claim 9, wherein the instructions, when executed by the processor, further cause the processor to determine the given fingerprint based on a shape of the tree.

15. A non-transitory machine readable storage medium storing instructions that, when executed by a machine, cause the machine to:

access a first query statement, a tuning parameter for the first query statement and a tolerance level defining a degree of association between the first query statement and the tuning parameter;

based on the tolerance level and a content of the first query statement, process the first query statement to generate a first hash value; and associate the first hash value with the tuning parameter.

16. The storage medium of claim 15, wherein the instructions, when executed by the machine, further cause the machine to:

process the second query statement to generate a second identifier;

determine a second hash value for the second identifier;

compare the second hash value to the first hash value; and processing the second query statement based on a result of the comparison.

17. The storage medium of claim 16, wherein the instructions, when executed by the machine, further cause the machine to:

determine a plurality of hash values for different identifiers for the second query statement; and process the second query statement in response to comparing the plurality of hash values to a plurality of hash values associated with other tuning parameters.

18. The storage medium of claim 15, wherein the tuning parameter comprises a directive to be used by a query optimizer in processing query statements having corresponding hash values that correspond to the first hash value.

19. The storage medium of claim 15, wherein the tuning parameter comprises a query optimizer directive to turn on hash joins for query statements having corresponding hash values that correspond to the first hash value.

20. The storage medium of claim 15, wherein the instructions, when executed by the machine, further cause the machine to:

normalize the first query statement to provide a first normalized query statement;

in response to the tolerance level representing a first value, generate the hash value based on the first normalized query statement;

in response to the tolerance level representing a second value less restrictive than the first value, process the first normalized query statement to remove at least one of a constant or a predicate from the first normalized query statement to generate a second normalized query statement, and generate the hash value based on the second normalized query statement; and in response to the tolerance level representing a third value less restrictive than the second value, generate a relational expression tree corresponding to the first normalized query statement, and generate the hash value based on the relational expression tree.

* * * * *